United States Patent [19]
Ahlberg et al.

[11] Patent Number: 4,857,632
[45] Date of Patent: Aug. 15, 1989

[54] RESIDUE REMOVAL PROCESS

[75] Inventors: David T. Ahlberg; Dilipkumar Padliya; Jeffery T. Reed, all of Sarnia, Canada

[73] Assignee: Polysar Limited, Sarnia, Canada

[21] Appl. No.: 205,813

[22] Filed: Jun. 13, 1988

[51] Int. Cl.$^4$ .............................................. C08F 6/00
[52] U.S. Cl. .................................. 528/487; 528/491; 528/492; 528/496; 528/502; 264/344; 366/97
[58] Field of Search ............... 528/502, 487, 491, 492, 528/496; 264/344; 366/97

[56] References Cited

U.S. PATENT DOCUMENTS 2,786,047 3/1957 Jones et al. ..................... 528/502 X
3,531,448 9/1970 Johnson ........................... 528/502 X

FOREIGN PATENT DOCUMENTS 1558491 1/1980 United Kingdom ............ 525/329.3

Primary Examiner—Joseph L. Schofer
Assistant Examiner—F. M. Teskin
Attorney, Agent, or Firm—Stevens, Davis, Miller & Mosher

[57] ABSTRACT

The present invention relates to a process to remove residue from partially hydrogenated nitrile rubber. The process is undertaken by mixing and kneading the rubber in the presence of an extractant fluid. The extractant fluid is a solvent for the residue but is not a solvent for the rubber. At the conclusion of the process, the rubber is separated from the residue-containing extractant fluid.

7 Claims, 4 Drawing Sheets

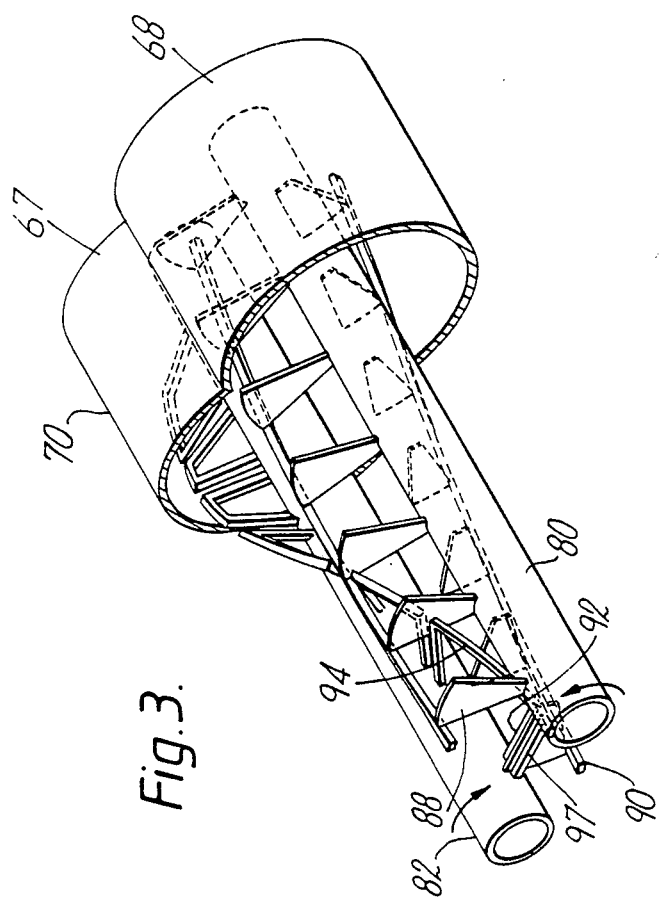

RESIDUE REMOVAL PROCESS

FIELD OF INVENTION

This invention relates to a process to extract residue from hydrogenated nitrile rubber (HNBR).

BACKGROUND OF THE INVENTION

Processes are known to remove residue from rubber. Most typically, the rubber is dissolved in a suitable solvent and a physical or chemical process is then used to separate the rubber from the undesirable residue. This type of process is cumbersome, particularly if toxicological concerns exist regarding the solvent, because it requires the handling of a large volume of viscous rubber solution.

Thus, a need exists for a process to remove residue from solid rubber without dissolving the rubber.

It is an object of the present invention to provide a process to extract residue from hydrogenated nitrile rubber without substantially dissolving the rubber.

SUMMARY OF THE INVENTION

Although the process technology as generally described herein may be suitable for the extraction of a wide variety of residues (for example, residual solvent, residual monomer, residual catalyst) from a wide variety of rubbers (such as butyl rubber and its halogenated derivatives, acrylonitrile-butadiene rubber, ethylene-propylene copolymers and terpolymers, and polybutadiene), the present invention relates solely to a process to extract residue from hydrogenated nitrile rubber.

Thus, in accordance with the present invention, there is provided:

a process to extract residue from hydrogenated nitrile rubber, consisting of:

(i) adding residue-containing hydrogenated nitrile rubber to a mixing/kneading zone which comprises a housing with at least one mixing shaft therein, said mixing shaft having mixing elements attached thereto and being rotatably mounted within said housing;

(ii) adding from 20 to 500 parts by weight, per 100 parts by weight of said rubber, of an extractant liquid to said mixing/kneading zone;

(iii) subjecting said hydrogenated nitrile rubber and said extractant liquid to a period of continuous mixing/kneading within said mixing/kneading zone, at a temperature below the boiling point of said extractant liquid;

(iv) repeatedly mechanically cleaning the mixing/kneading zone;

(v) discharging said hydrogenated nitrile rubber and said extractant liquid from said mixing/kneading zone; and (vi) separating said liquid from said rubber; characterized in that said process is completed without the addition of a solvent for said hydrogenated nitrile rubber.

The extractant liquid is essential to the present process. Whilst it is not intended that the invention should be limited by any particular theory, it is believed that the extractant becomes dispersed throughout the without substantially dissolving the rubber) during the mixing/kneading process. The extractant liquid extracts residue from the hydrogenated nitrile rubber during the mixing and kneading step. The extractant liquid, containing residue, is then separated from the hydrogenated nitrile rubber.

It will be clear from the above description that the extractant liquid must be miscible with at least part of the residue contained in the hydrogenated nitrile rubber. However, the extractant must not be a good solvent for the rubber. Suitable examples of the extractant liquid include lower alcohols (such as methanol and ethanol), acetonitrile, and perchloroethylene. More than one extractant may be employed.

The term hydrogenated nitrile rubber as used herein refers to the product which is obtained by hydrogenating an unsaturated polymer of a $C_{3-5}$, $\alpha,\beta$ unsaturated nitrile and a $C_{4-6}$ conjugated diene (for example, acrylonitrile-butadiene rubber). Hydrogenated nitrile rubbers are sold under the trade name ZETPOL by Nippon Zeon. A process to prepare hydrogenated nitrile rubber is described in U.K. Pat. No. 1,558,491, the disclosure of which is incorporated herein by reference.

It will be clear to persons skilled in the art that hydrogenated nitrile rubber may contain residue remaining from the hydrogenation process, such as residual catalyst, residual co-catalyst, residual solvent and/or residue which may have been contained within the nitrile rubber prior to hydrogenation. Thus, although the present invention relates to a "solvent-free" process (meaning that no solvent for the rubber is added during the process), it must be recognized that a minor amount of solvent may be contained within the rubber as a residue.

Residue is removed from hydrogenated nitrile rubber in the present process with the assistance of an extractant liquid. The amount of extractant employed is from 20 to 500 parts by weight per 100 parts by weight rubber, preferably from 30 to 200 parts by weight.

It is particularly preferred to further include in the extractant fluid a chelating agent, such as thiourea or alkyl bromide.

Preferred embodiments of the invention will now be described in detail, with reference to the accompanying drawings.

BRIEF DESCRIPTION OF THE DRAWINGS

FIG. 3 is a perspective view of the mixing/kneading zone of FIG. 2;

DESCRIPTION OF THE PREFERRED EMBODIMENTS

Figure 1:
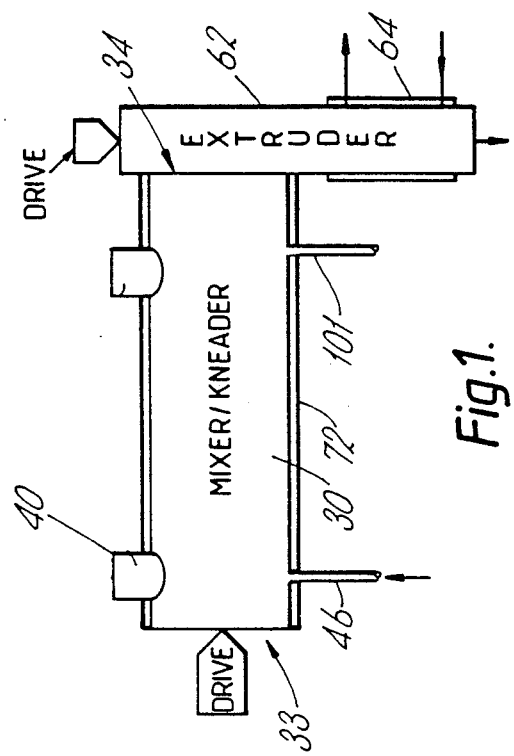
FIG. 1 is a schematic representation of an apparatus and process flow sheet for removing residue from hydrogenated nitrile rubber.

The mixing/kneading zone into which the hydrogenated nitrile rubber and extractant liquid are introduced is suitably an apparatus equipped with mixing/kneading elements to which the rubber/liquid mixture is brought into continuously moving contact. The function of the mixing/kneading elements is to ensure continuous intimate mixing of the mixture in the zone, and to ensure that the mixture is in continuously moving contact with the mixing surfaces. It is believed that the mixing generates new rubber surfaces which assist with mass transfer of residue from the rubber to the extractant liquid.

There is preferably no dead-space within the mixing/kneading zone.

Preferably, the apparatus constituting the mixing/kneading zone is in the form of a stationary drum, equipped with rotary mixing/kneading elements arranged to wipe continuously against the interior of the boundary walls as they rotate and perform their mixing/kneading function. The boundary walls and/or the mixing/kneading elements may be heated. In this way the rotary mixing/kneading elements serve to clean the mixing zone walls as they mix and knead.

These mixing/kneading elements can be paddles, arms, bars, discs, disc segments, pins or combination thereof. These elements are preferably mounted on at least one rotatable shaft within the housing. The use of two shafts is particularly preferred and such shafts may be either co-rotating or counter-rotating during operation and the mixing/kneading elements on the shafts may intermesh or be non-intermeshing during operation. The shaft or shafts may also reciprocate as well as rotate.

Also in the preferred embodiment, a further set of rotary elements is provided, to move relative to the rotary mixing/kneading elements, and arranged to wipe against the mixing/kneading elements as they rotate and thereby clean the surfaces of the mixing/kneading elements, and the rotary shaft on which they are mounted, as the mixing and kneading proceeds. Such an apparatus is available on the commercial market, for example that known as the AP CONTI, available from List A.G., of Pratteln, Switzerland.

Preferably, the mixing/kneading zone is divided into sub-zones. This can be effected using weirs or baffles mounted on the housing or by using discs on the shaft or shafts. Also preferred is to have liquid removal means in at least one of the sub-zones. This liquid removal means is located in the lower half of the housing and is preferably provided with means to keep the liquid removal means clear of rubber.

In practice, the mixing/kneading zone is maintained from about one quarter to about three quarters full of mixture to allow sufficient mixing/kneading space within the mixing/kneading zone for efficient residue removal. This zone can be operated at any suitable pressure, i.e. atmospheric, below atmospheric or above atmospheric, within the tolerance limits of the chosen apparatus. The temperature is maintained below the boiling point of the extractant liquid.

In one preferred embodiment of the present invention, the rubber discharged from the mixing/kneading zone is supplied to a devolatilizing extruder thereby yielding rubber containing essentially no extractant liquid and which is suitable, after cooling, for packaging.

The operation of the residue removal process will now be described with reference to FIG. 1.

Hydrogenated nitrile rubber is introduced in a continuous manner, into the mixing/kneading apparatus 30 through the inlet 40, near the forward end 33. In one embodiment of the invention, extractant liquid is added co-currently through inlet port 46. The rubber/extractant mixture is mixed and kneaded in the apparatus 30. The temperature of the mixing/kneading zone is slightly below the boiling point of the extractant liquid. When the rubber and extractant enter the apparatus 30, they contact the moving internal surfaces of the mixing zone (such as mixing shaft 80 and cleaning shaft 82, illustrated in FIG. 2).

The moving internal surfaces of the apparatus 30 mix and knead the mixture, which is transported towards the downstream end 34. The extractant liquid is removed at drain 101, and the rubber is discharged through the extruder 62. This extruder 62 is provided with a jacket 64 through which heat transfer medium can flow.

The extractant liquid contains residue which has been removed from the rubber.

In this preferred embodiment, the rubber which is discharged from the extruder 62 is ready for final finishing (which may include devolatilization, drying and packaging).

In the continuous process described above, the hydrogenated nitrile rubber (HNBR) is continuously added at 40, and is withdrawn from the extruder 62 at a similar rate.

It will be apparent that the process may be operated with the extractant liquid being added counter-currently (rather than co-currently, as described above). It will also be apparent that the process could be completed batch-wise, using a mixing/kneading apparatus which is designed for batch use.

Figure 4A:
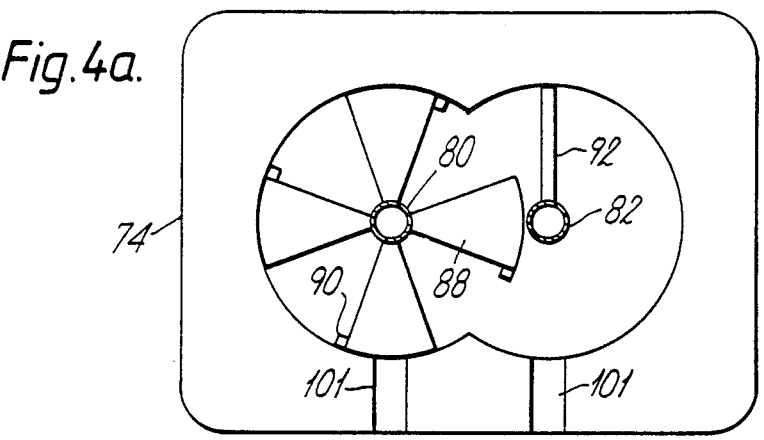
FIGS. 4a and 4b are cross-sectional views of the apparatus along the lines 4a—4a and 4b—4b respectively of FIG. 2.

The mixing/kneading apparatus 30 will now be described in more detail with reference to FIGS. 1 to 5. The apparatus has an internal mixing/kneading zone and is shown in FIG. 2 as consisting of three interconnected, commercially-available AP CONTI modules 66 similar to the apparatus described in U.S. Pat. No. 3,689,035. All the modules are not identical: they may be equipped with vent ports, drain openings and the like. However, all the modules are of otherwise similar configuration. From three to ten of such modules 66 can be interconnected to form the mixing/kneading apparatus. These modules 66 each have a housing 67 with a "Figure 8"-shaped cross-section (FIG. 4a). One portion of the cross-section (FIG. 3) is the main housing portion 68 and the other portion is the auxiliary housing portion 70. The housing 67 as a whole is provided (FIG. 2) with an outer jacket 72, for heating and cooling purposes. The jacket is suitably designed for handling pressurized fluids up to about 12 atmospheres at temperatures up to about 350° C.

Figure 4B:
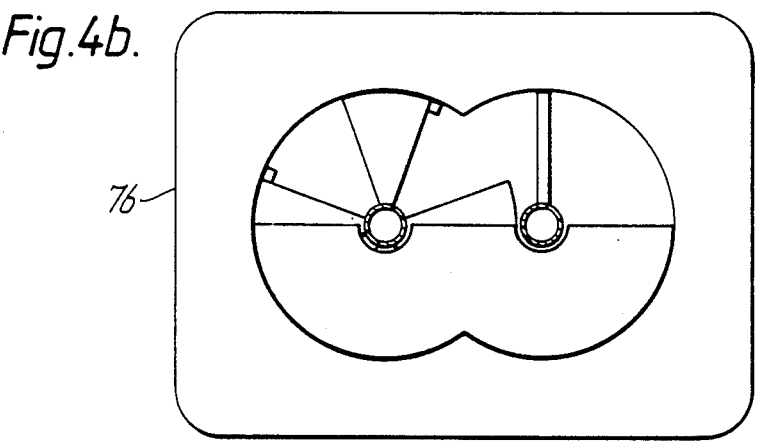

The modules are interconnected via spacer plates 74, 76 shown on FIGS. 4a and 4b, which are of two different types. Spacer plate 74 is simply a metal gasket, of the same size and periphery as the ends of the modules it interconnects. It allows for free flow and communication of materials contained in the mixer, between one module and the next. Spacer plate 76 is a metal gasket equipped with a weir plate extending part way up from the bottom periphery and having a straight horizontal upper edge, with appropriate indentation to accommodate the shafts of the mixing/kneading apparatus, so as to provide a weir between adjacent modules, whereby hold-up and thus residence time of material in a given module can be controlled. The height of the upper edge of the spacer plate 76 may be adjusted for this purpose.

The upstream end 33 and the downstream end 34 (FIG. 1) of the apparatus are each provided with "Figure 8"-shaped flanged covers 75 and 75' (FIG. 2). At the upstream end 33 of the apparatus, there is provided a transmission 77 and a drive motor 78 capable of providing variable speed rotation to each shaft. Each module has two hollow shafts 80, 82 rotatably mounted therein, the first mixing shaft 80 being located in the main housing portion 68 and the other, cleaning shaft 82 being parallel to the mixing shaft 80 and located in the auxiliary housing portion 70. At the inlet end of the apparatus, packing rings 86 are located between the shafts 80, 82 and the flanged cover 75. At the outlet end of the apparatus, shafts 80 and 82 are supported and rotate on bearings 87.

As best shown in FIG. 3, mounted on the mixing shaft 80 are axially spaced, radially extending, disk-shaped hollow segments 88 arranged in four circumferentially spaced sets, each set extending helically down the shaft 80, only two of which are shown in FIG. 3 for clarity purposes. Each set of segments 88 is connected together along the leading periphery by kneading bars 90 which extend along a helical line from one end of the shaft 80 to the other. These kneading bars contact the inner surface of the main housing portion 68.

The cleaning shaft 82 has one set of helically arranged, radially extending arms 92 with adjacent pairs of these arms 92 being interconnected by cleaning bars 94 to provide a hurdle-type arrangement. These cleaning bars 94 contact the inner surface of the auxiliary housing portion 70. The helical angle of the arms 92 is greater than that of the mixing shaft kneading bars 90 and is chosen so that the arms 92 of the cleaning shaft 82 mesh with and clean the sides of the disk-shaped hollow segments 88 of the mixing shaft 80 upon rotation of the two shafts 80, 82. Also, the height of the upper surfaces of the cleaning bars 94 is arranged so that they can wipe the undersurface of kneading bars 90 and the surface shaft 80. End wall wipers 97 are optionally provided (FIG. 2) at each end of the mixing shaft 80 to wipe the inside surfaces of the flanged covers 75 and 75'. Spacer plate 76 as shown in FIG. 4b may be wiped with additional wipers which may be provided on the shafts for that purpose. Suitably, the motor and transmission can drive the mixing shaft at 3-20 rpm and the cleaning shaft at 12-80 rpm. The speed ratio of the mixing shaft to the cleaning shaft is preferably essentially constant at from 1:2 to 1:6, most preferably at about 1:4.

Figure 5:
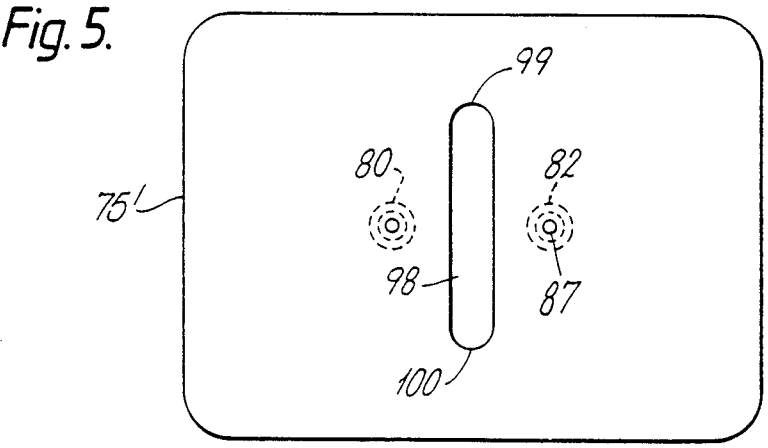
FIG. 5 is a cross-sectional view along line 5—5 of FIG. 2.

At the downstream end 34 of the apparatus 30, the flanged cover 75', as can be best seen in FIG. 5, is provided with a vertical slot 98 extending from apex 99 to apex 100 of the "Figure-8"-shaped cross-section of the housing and with circular apertures for bearings 87 to support shafts 80 and 82. This slot 98 provides communication to the downwardly extending discharge extruder 62.

Figure 2:
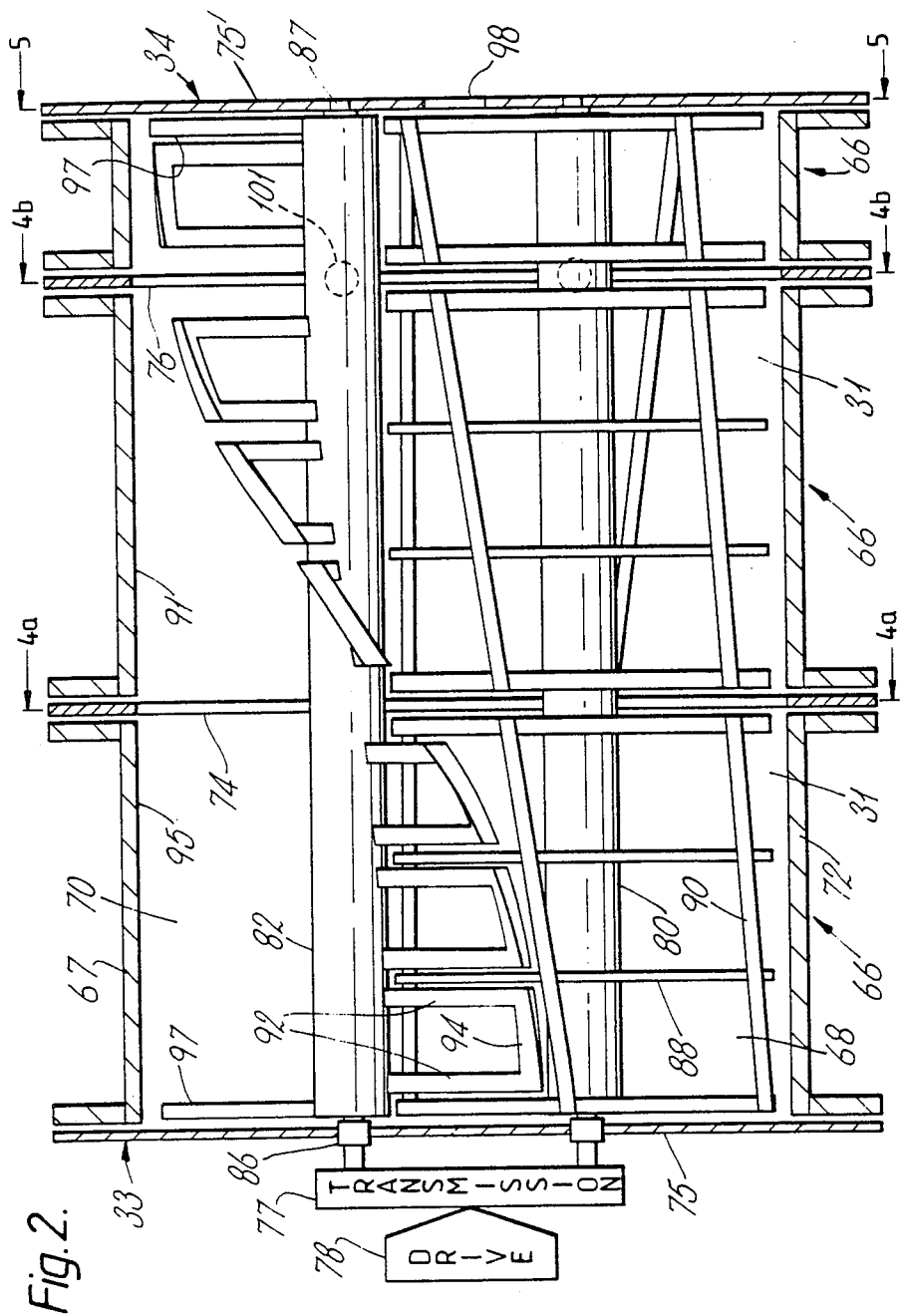
FIG. 2 is a detailed diagrammatic view partly in section of a mixing/kneading zone of the apparatus of FIG. 1, taken along the line 2—2 of FIG. 1 so as to show the lower part in plan.

Also provided toward the downstream end 34 of the apparatus 30 is a drain opening 101 indicated in FIGS. 1, 2 and 4a. This drain opening is suitably covered by a screen to retain rubber. This screen is most suitably made up of tri-rod or iso-rod screen bars, a wire mesh, or a plate with plurality of small holes therein.

The discharge extruder 62 is provided with a variable speed drive (not shown) so that suitably the screw of the extruder can be driven at speeds from 10-200 rpm.

It will be noted that the apparatus 30 of the preferred embodiment described above is an apparatus provided with vents, drains, etc. Material is moved downstream therein, not by the rotation and disposition of the mixing elements, but is gently pushed by the kneading bars 90 and 94, with positive discharge, out of exit slot 98 into extruder 62. The apparatus 30 is in no sense an extruder, because the mixing/kneading elements are not capable of compressing the rubber for the apparatus to act as an extruder.

The process will be further described with respect to the following, non-limiting examples which were carried out using either a continuous process or a batch process.

EXAMPLE 1

A hydrogenated nitrile rubber was prepared with a rhodium-based catalyst and a triphenyl phosphine based co-catalyst. Analysis of this rubber showed it to contain 116 ppm Rh and 1.46 weight percent triphenyl phosphine.

The rubber was introduced into an A. P. Conti machine operated in a continuous manner. The machine was operated at atmospheric pressure, after heating it to about 60° C. and setting the main rotor speed set at 6.5 rpm and the cleaning rotor speed set at 26 rpm.

The rubber feed rate was about 25 Kg per hour. Methanol, added counter-currently at a rate of 30 liters per hour, was used as the extractant fluid.

Rubber was collected from the discharge end and subjected to analysis. The rhodium content was determined to be reduced to 86 ppm and the triphenyl phosphine concentration was found to be 1.18 weight percent. A sample of the extractant fluid was also analyzed, and found to contain 15 ppm Rh and 0.04 weight percent triphenyl phosphine.

EXAMPLE 2

Rubber which was treated in the manner described in Example 1 was re-introduced into the same A. P. Conti machine, operating under the same temperature and speeds of rotation.

Thus, once-extracted rubber was added to the machine in a continuous process, at a rate of about 32 Kg per hour.

The extractant fluid used in this example was thiourea-in-methanol (0.1 weight/volume percent), and was added at a rate of 30 liters/hour.

Three samples of hydrogenated nitrile rubber were analyzed and found to contain 66, 71 and 69 ppm of Rh, respectively, indicating a further reduction in the amount of Rh contained in the rubber.

EXAMPLE 3

This example illustrates a batch extraction process.

2.4 Kg of hydrogenated nitrile rubber containing 1.2% weight percent residual solvent (chlorobenzene) was added to a batch kneading/mixing machine, manufactured by List. 2.4 Kg of methanol were also added to the machine. The machine was operated at about 60° C. and atmospheric pressure, well below boiling conditions for methanol.

After 60 minutes, 1.6 Kg of the extractant fluid was drained. A sample of the rubber was analyzed and found to contain about 0.8 weight percent chlorobenzene.

1.6 Kg of fresh methanol was then added to the machine, and the process was repeated at about 60° C. for a further 60 minutes. The extractant fluid was then drained.

A sample of the rubber was analyzed and found to contain 0.4 weight percent chlorobenzene.

What is claimed is:

1. A solvent-free process to extract residue from hydrogenated nitrile rubber, said process comprising:
   (i) adding residue-containing hydrogenated nitrile rubber to a mixing/kneading zone which comprises a housing with at least one mixing shaft therein, said mixing shaft having mixing elements attached thereto and being rotatably mounted within said housing;

(ii) adding from 20 to 500 parts weight, per 100 parts by weight of said rubber, of an extractant liquid to said mixing/kneading zone, at a temperature below the boiling point of said extractant liquid;

(iii) subjecting said hydrogenated nitrile rubber and said extractant liquid to a period of continuous mixing/kneading within said mixing/kneading zone;

(iv) repeatedly mechanically cleaning the mixing/kneading zone;

(v) discharging said hydrogenated nitrile rubber from said mixing/kneading zone;

(vi) discharging said extractant liquid from said mixing/kneading zone, and separating said liquid from said rubber;

wherein said extractant liquid is not a good solvent for said rubber but is miscible with at least part of said residue, characterized in that said process is completed without the addition of a solvent for said hydrogenated nitrile rubber.

2. The process of claim 1 which further comprises passing said hydrogenated nitrile rubber through an extruder, after discharging it from said mixing/kneading zone.

3. The process of claim 1 when completed in a continuous manner.

4. The process of claim 1 wherein said extractant comprises from 20 to 200 parts by weight methanol per 100 parts by weight of said hydrogenated nitrile rubber.

5. The process of claim 1 wherein said extractant is perchloroethylene.

6. The process of claim 4 wherein said extractant further contains thiourea.

7. The process of claim 6 when completed at a temperature of between 50° and 60° C. and atmospheric pressure.

* * * * *